United States Patent
Roh et al.

(10) Patent No.: US 6,442,952 B2
(45) Date of Patent: Sep. 3, 2002

(54) SYSTEM AND METHOD FOR CONTROLLING COMMUNICATION-EXECUTABLE REFRIGERATOR

(75) Inventors: Young Hoon Roh, Seoul-si; Kwang Choon Kim; Chul Jin Cho, both of Kyungki-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/832,814

(22) Filed: Apr. 12, 2001

(30) Foreign Application Priority Data

Jun. 19, 2000 (KR) ......................... 2000/33648
Jun. 19, 2000 (KR) ......................... 2000/33649
Jun. 19, 2000 (KR) ......................... 2000/33650

(51) Int. Cl.$^7$ ............................................. F25B 49/00
(52) U.S. Cl. ................................. 62/127; 236/51
(58) Field of Search ...................... 62/125, 126, 127, 62/129, 130; 236/51, 94; 165/11.1

(56) References Cited

U.S. PATENT DOCUMENTS

| | | | | |
|---|---|---|---|---|
| 4,358,932 A | * | 11/1982 | Helfrich, Jr. | .............. 62/130 X |
| 5,335,509 A | * | 8/1994 | Namisniak et al. | ............ 62/125 |
| 6,170,273 B1 | * | 1/2001 | Bosi | .............................. 62/127 |
| 6,216,479 B1 | * | 4/2001 | Elwood | ..................... 62/127 X |
| 6,260,765 B1 | * | 7/2001 | Natale et al. | .............. 236/51 X |

* cited by examiner

*Primary Examiner*—Harry B. Tanner
(74) *Attorney, Agent, or Firm*—Birch, Stewart, Kolasch & Birch, LLP (57) ABSTRACT

A system and method for controlling a refrigerator capable of transmitting and receiving information over an external communication network. A display unit is installed on the front surface of the refrigerator, and a touch panel is connected to the display unit to input a variety of user commands. A schedule management function, a self-diagnosis management function and a component replacement time management function are performed and, if an emergency situation occurs while those functions are performed, a pop-up message is outputted to the screen and information related to the pop-up message is transmitted over the external communication network. Therefore, the user can recognize an emergency situation at an accurate date, manage the refrigerator more efficiently and rapidly and handle information more conveniently. A touch panel and a radio remote controller are selectively used to input a variety of function key signals enabling a user to watch television through the display unit. Therefore, during housekeeping, the user can conveniently watch the television, enter desired key signals or check delivered mails or character messages based on key inputs entered by himself or herself. A camera and microphone are provided to send and receive image and voice mails, thereby removing the inconvenience of key input.

21 Claims, 5 Drawing Sheets

SYSTEM AND METHOD FOR CONTROLLING COMMUNICATION-EXECUTABLE REFRIGERATOR

BACKGROUND OF THE INVENTION

1. Field of the Invention

The present invention relates in general to a system and method for controlling a communication-executable refrigerator, and more particularly to a system and method for controlling a refrigerator capable of transmitting and receiving information over an external communication network, wherein a schedule management function, a self-diagnosis management function and a component replacement time management function are performed and, if an emergency situation occurs while those functions are performed, a pop-up message is outputted to the screen and information related to the pop-up message is transmitted over the external communication network in real time.

2. Description of the Prior Art

Generally, refrigerators are food storage cases with a space for food storage therein. In such a refrigerator, an insulating material is used to insulate the internal space from external environments, and electricity, gas, ice, etc. are used to lower the internal temperature, such that food and the like are cooled or stored at a low temperature for their prevention from decay.

In each home, a refrigerator is generally installed in a kitchen or a place nearest to the kitchen to conveniently preserve food to be cooked or which has already been cooked.

However, it is conventionally next to impossible for a housekeeper in each home to watch television while cooking or handling food. Also, a refrigerator possibly occupying the largest area in a kitchen of each home is usually positioned irrespective of a place where the television is installed. For these reasons, in order to watch the television during housekeeping, the housekeeper must stop work and then move to the place where the television is installed, resulting in an inconvenience of use.

Furthermore, it is conventionally next to impossible for a housekeeper in each home to use communication means such as the Internet or telephone as well as to watch television while cooking or handling food. Also, a refrigerator possibly occupying the largest area in a kitchen of each home is usually positioned irrespective of places where the television and communication means are installed. For these reasons, in order to watch the television or use the communication means during housekeeping, the housekeeper must stop work and then move to the place where the television or communication means is installed, resulting in an inconvenience of use.

Recently, with the increasing interest in the Internet, housekeepers have increasingly and widely used information obtained from the Internet. Because the housekeepers perform the majority of daily work in kitchens, they each must move to a separate space to use an Internet-accessible computer. Moreover, the housekeepers each must manipulate specific keys on a keyboard to create mails and forward them over the Internet, resulting in an inconvenience of use.

SUMMARY OF THE INVENTION

Therefore, the present invention has been made in view of the above problems, and it is an object of the present invention to provide a system and method for controlling a refrigerator capable of transmitting and receiving information over an external communication network, wherein a display unit is installed on the front surface of the refrigerator to display an image on its screen, a touch panel is connected to the display unit to input a variety of user commands through touch by the user, a schedule management function, a self-diagnosis management function and a component replacement time management function are performed and, if an emergency situation occurs while those functions are performed, a pop-up message is outputted to the screen and information related to the pop-up message is transmitted over the external communication network.

It is another object of the present invention to provide a system and method for controlling a communication-executable refrigerator, wherein a touch panel and a remote controller are selectively used to input a variety of function key signals enabling a user to watch television, so that the user can conveniently watch the television or enter desired key signals during housekeeping, a display unit is provided such that the user can check delivered mails or character messages based on key inputs entered by himself or herself, and a camera and microphone are provided to send and receive image and voice mails.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
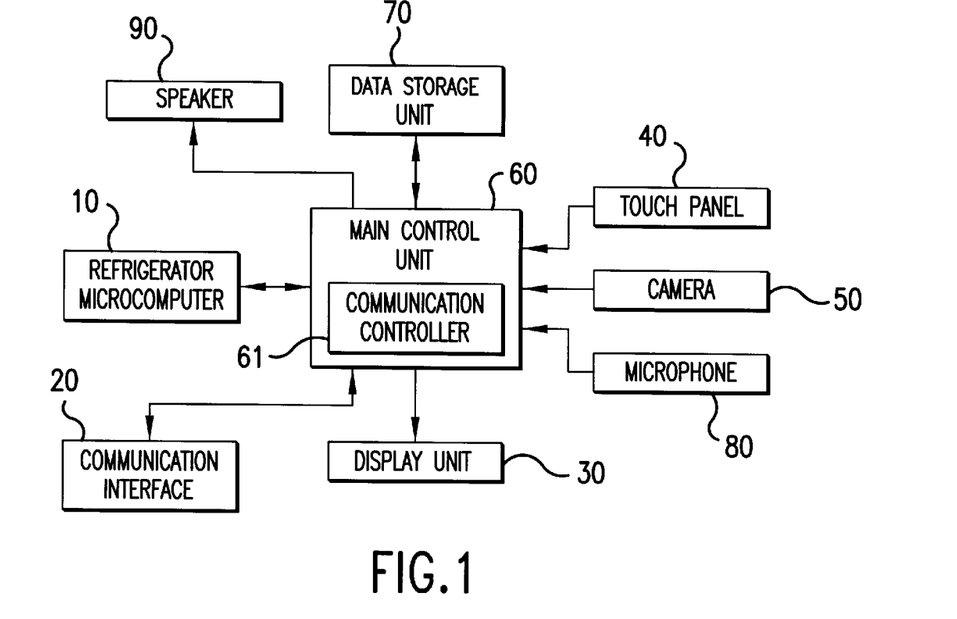
FIG. 1 is a block diagram showing the construction of a message management system of a refrigerator in accordance with the present invention.

With reference to FIG. 1, there is shown in block form the construction of a message management system of a refrigerator in accordance with the present invention. As shown in this drawing, the message management system comprises a refrigerator microcomputer 10 for controlling all components in the refrigerator to perform refrigeration and freezing functions of the refrigerator, a communication interface 20 installed in the refrigerator and connected to an external communication network for performing data communication, and a display unit 30 installed on the front surface of the refrigerator for displaying an image on its screen in response to an external video control signal. A touch panel 40 is connected to the display unit 30 to calculate coordinate values of a contact point with a user, detect a position of the calculated coordinate values from the screen and input a command corresponding to the detected position. A camera 50 is mounted to the refrigerator to pick up an image within a given area and generate the resulting video signal. A main control unit 60 is provided to control an image output to the display unit 30 and perform a function associated with the command inputted by the touch panel 40, a mail sending/reception function, a pop-up message management function and a television watching control function. A data storage unit 70 is adapted to store or output information in response to a write or read command from the main control unit 60. A microphone 80 is mounted to the refrigerator to perform a voice mail input function under the control of the main control unit 60. A speaker 90 is mounted to the refrigerator to perform a voice mail output function under the control of the main control unit 60.

Preferably, the communication interface 20 includes a modem, and the display unit 30 includes a liquid crystal display (LCD). The speaker 90 outputs an external audio signal or an alarm signal upon the display of a pop-up message on the screen. The microphone 80 inputs an audio signal for creation of a voice message, thereby making it possible to create a composite message of voice and characters. The camera 50 enables the creation of an image message or the utilization of a videophone.

The main control unit 60 includes a communication controller 61 for controlling the connection to the external communication network through the communication interface 20. Upon detecting the reception of a mail through the communication interface 20 under the control of the communication controller 61, the main control unit 60 blinks a specific button to inform the user of the mail reception until the user checks the received mail.

The main control unit 60 is also connected to the refrigerator microcomputer 10 through the communication interface 20 under the control of the communication controller 61 to display information about the mail reception on the display unit 30 until the user checks the received mail.

The data storage unit 70 is adapted to compression-store an image mail under the control of the main control unit 60 for sending or reception of the image mail using the camera 50, speaker 90 and microphone 80.

The data storage unit 70 is also adapted to compression-store an image picked-up by the camera 50 for its easy sending by mail. Preferably, the data storage unit 70 includes an address directory memory (not shown) for storing a directory of mail destination addresses created by the user.

The display unit 30 is adapted to display an image preset by the main control unit 60 or an external image received through the communication interface 20. The touch panel 40 is connected to the display unit 30 to calculate coordinate values of a contact point with the user's hand or a touch pen, detect a position of the calculated coordinate values from the screen and input a command corresponding to the detected position.

The main control unit 60 is also connected to the refrigerator microcomputer 10 under the control of the communication controller 61 to perform a schedule management function such as an electronic note function, a self-diagnosis management function for diagnosing faulty function states and a component replacement time management function for informing the user of time points for replacement of a filter and other components. If an emergency situation such as the arrival of an appointed date or the detection of a function fault occurs, then the main control unit 60 outputs a pop-up message to the display unit 30.

Further, the main control unit 60 outputs an information transmission button image to the display unit 30 for the transmission of information related to the pop-up message through the communication interface 20. Then, the main control unit 60 creates or transmits information in response to a command inputted through the touch panel 40.

The information transmission button image includes an order button for gaining access to a specific site on the Internet over the external communication network and purchasing desired goods from the specific site, a call button for generating an external call upon the detection of a function fault during the execution of the self-diagnosis management function or at a time point for component replacement, and a message send button for sending a specific message to a mobile terminal of a call number set by the user at a time set by the user.

Figure 2:
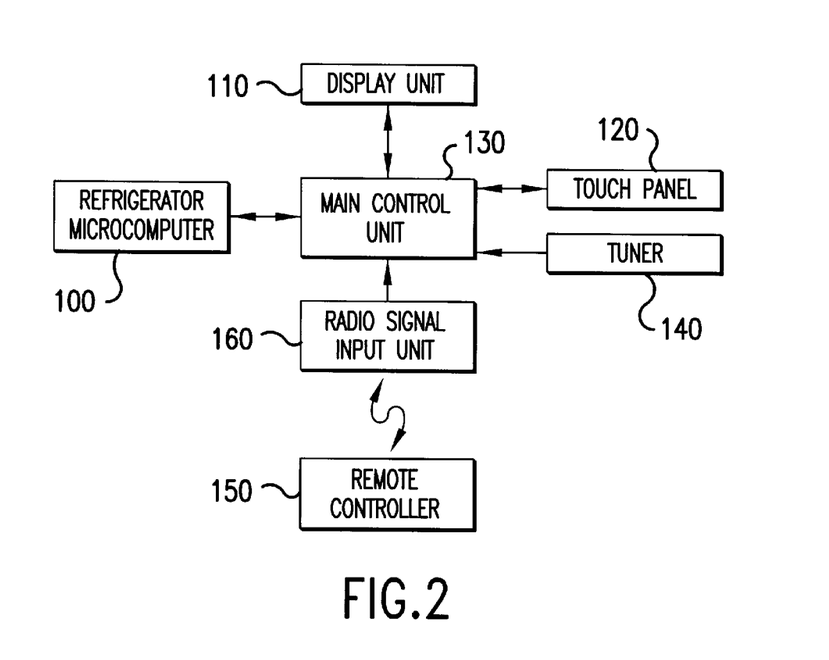
FIG. 2 is a block diagram schematically showing the construction of television watching control means of a control system of a communication-executable refrigerator in accordance with the present invention.
Figure 3:
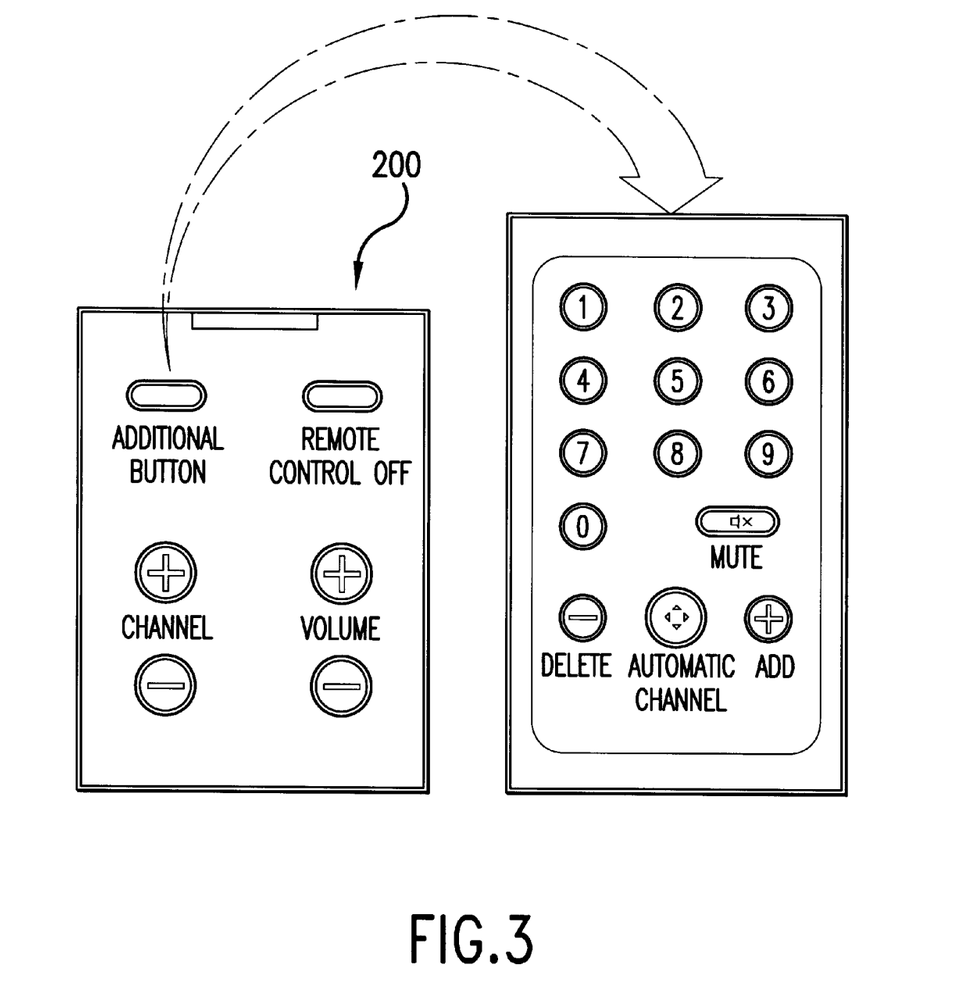
FIG. 3 is a view showing a button image displayed on a display unit in FIG. 2.

FIG. 2 is a block diagram schematically showing the construction of television watching control means of a control system of a communication-executable refrigerator in accordance with the present invention and FIG. 3 is a view showing a button image displayed on a display unit in FIG. 2. As shown in FIG. 2, the television watching control means comprises a refrigerator microcomputer 100, display unit 110, touch panel 120, main control unit 130, tuner 140 and radio signal input unit 160. The tuner 140 functions to perform a channel selection or tuning operation for television reception under the control of the main control unit 130. The radio signal input unit 160 functions to input a radio signal which is transmitted from a remote controller 150 according to a user's operation and transfer the inputted radio signal to the main control unit 130.

The display unit 110 preferably includes an LCD for displaying an image in response to an external video control signal. Further, the display unit 110 displays a button image 200 under the control of the main control unit 130. The button image 200 includes a variety of function key buttons for television watching, such as a channel selection button, volume adjustment button, etc.

In the present embodiment, as shown in FIG. 3, the button image 200 is a kind of remote control window including a channel selection button, volume adjustment button, additional function button and remote control off button. The additional function button is used for automatic channel selection and muting, and the remote control off button is used for removal of the remote control window.

If the additional function button is pushed, then a variety of function buttons are additionally displayed on the display unit 110. These function buttons may be, for example, numeral buttons for direct selection of desired channels, a mute button for execution of a muting function, a storage button for storage of a currently selected channel, an automatic channel button for automatic storage of all broadcasting channels, and an erase button for erasure of the currently selected channel.

The speaker 90 is mounted to the refrigerator to output an audio signal from a broadcasting channel selected by the user.

The operation of the control system of the communication-executable refrigerator with the above-stated construction in accordance with the present invention will hereinafter be described in detail with reference to FIGS. 4 to 6.

Figure 4:
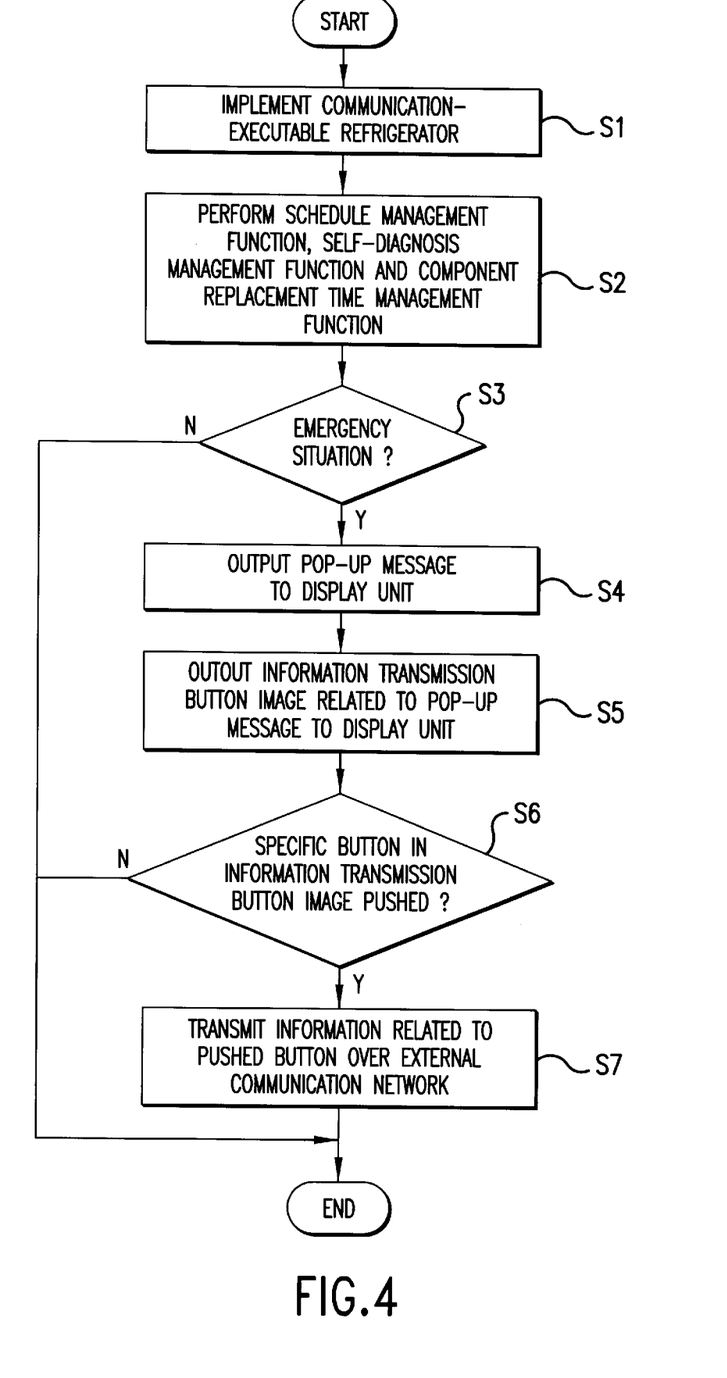
FIG. 4 is a flowchart illustrating a message management step of a method for controlling the communication-executable refrigerator in accordance with the present invention.

FIG. 4 is a flowchart illustrating a message management step of a method for controlling the communication-executable refrigerator in accordance with the present invention. At the first step S1, the communication interface 20, display unit 30, touch panel 40, main control unit 60 and communication controller 61 are provided in the refrigerator for the implementation of data communication over the external communication network. Here, the main control unit 60 controls the display unit 30 and touch panel 40, and the communication controller 61 controls the connection to the external communication network through the communication interface 20.

At the second step S2, the main control unit 60 performs a schedule management function, a self-diagnosis management function and a component replacement time management function according to user's items inputted through the touch panel 40.

At the third step S3, the main control unit 60 determines whether an emergency situation, such as the arrival of an anniversary or other special occasion preset by the user, the detection of a function fault or the arrival of a time point for component replacement, has occurred while performing the schedule management function, self-diagnosis management function and component replacement time management function at the above second step S2.

At the fourth step S4, upon determining at the above third step S3 that an emergency situation has occurred, the main control unit 60 creates a pop-up message about the emergency situation and outputs it to the display unit 30. Also, at the fifth step S5, the main control unit 60 outputs an information transmission button image related to the pop-up message created at the above fourth step S4 to the display unit 30.

Provided that the user views the pop-up message and information transmission button image displayed on the display unit 30 at the above fourth and fifth steps S4 and S5, he or she will push an order button to purchase specific goods suitable for an anniversary or other special occasion, a call button to call a service center for a fault report or filter replacement, or a message send button to send a specific character message to a mobile terminal. At the sixth step S6, the main control unit 60 determines which one of the order button, call button and message send button has been pushed.

At the seventh step S7, if it is determined at the above sixth step S6 which one of the order button, call button and message send button has been pushed, the main control unit 60 reads a destination address associated with the pushed button from the address directory memory and transmits information related to the pushed button to the read destination address via the communication interface 20 and the external communication network.

Figure 5:
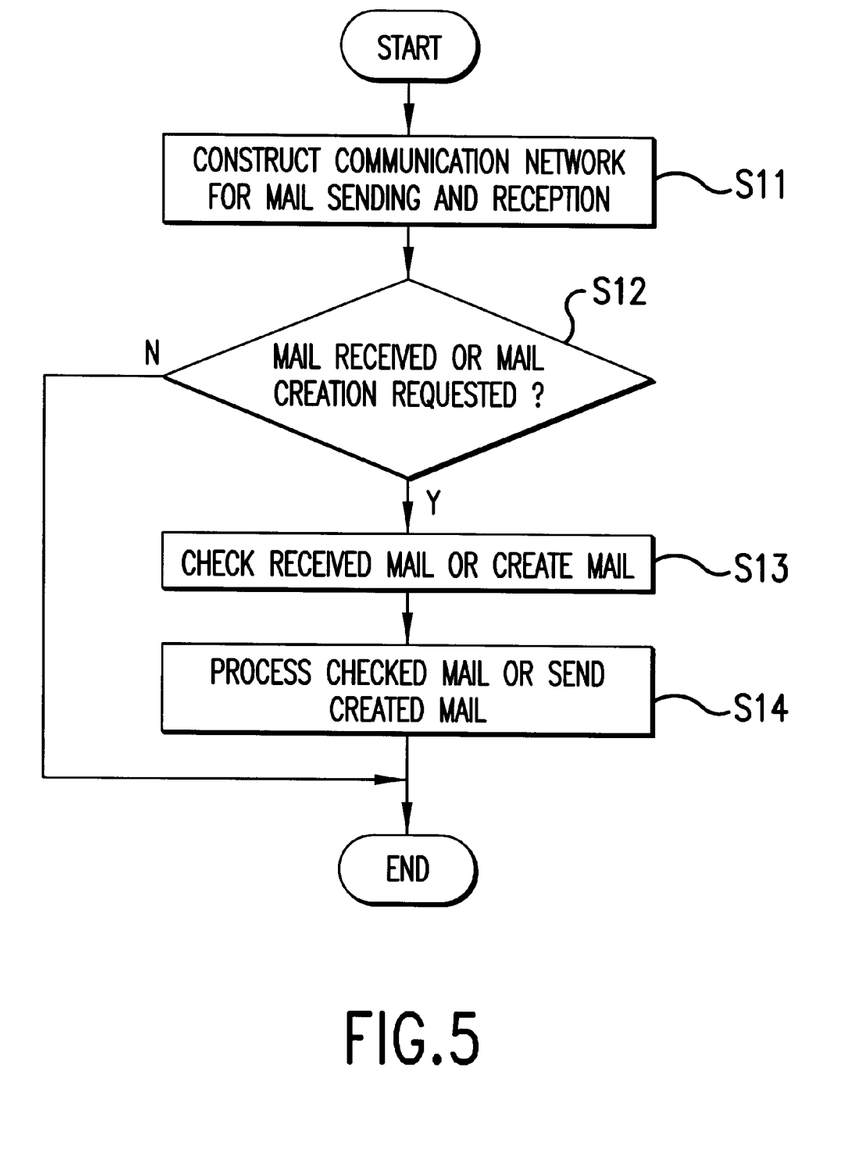
FIG. 5 is a flowchart illustrating a mail sending/reception step of the method for controlling the communication-executable refrigerator in accordance with the present invention.

FIG. 5 is a flowchart illustrating a mail sending/reception step of the method for controlling the communication-executable refrigerator in accordance with the present invention. Similarly to FIG. 4, at the first step S11, the communication interface 20, display unit 30, touch panel 40 and main control unit 60 are provided in the refrigerator for the implementation of data communication over the external communication network. In addition, the camera 50, speaker 90 and microphone 80 are provided in the refrigerator for the purpose of creating or checking an image mail.

At the second step S12, the main control unit 60 determines whether an external image mail has been received over the external communication network or whether the user desires to create a mail composed of characters, voice or an image using the camera 50, microphone 80 and touch panel 40.

The user can create a character mail of only characters using the touch panel 40, a voice mail using the microphone 80 and an image mail using the camera 50, individually, at the above second step S12. As an alternative, the user may create a mail composed of an appropriate combination of characters and voice, voice and an image, characters and an image, and characters, voice and an image.

At the third step S13, upon determining at the above second step S12 that the user desires to create a mail of characters, voice or an image, the main control unit 60 outputs a message window for mail creation to the screen of the display unit 30. Alternatively, if it is determined at the above second step S12 that an external image mail has been received over the external communication network, the main control unit 60 stores the received mail in the data storage unit 70 and then outputs the stored mail to the display unit 30 and speaker 90 such that the user checks the received mail.

The message window includes a write button, erase button and delete button, which execute corresponding functions for message creation when the user pushes them with his or her hand or the touch pen.

The user can check the received mail on the message window by selecting an image mail button, voice mail button or character mail button according to the type of the received mail. Also, the user can manage the received mail by selecting a reply letter write button or delete button after checking the received mail.

Image mails are compression-stored for reduction in size, so that they can be smoothly transmitted and received.

At the fourth step S14, if a mail is created at the above third step S13, the main control unit 60 sends the created mail to a destination address designated by the user. Alternatively, if the received mail is checked by the user, the main control unit 60 deletes or stores the checked mail according to a user's selection.

Preferably, an address directory memory is provided to store a directory of mail destination addresses created by the user and a list of personal information created by the user and selectively output desired information in response to a user's request.

Figure 6:
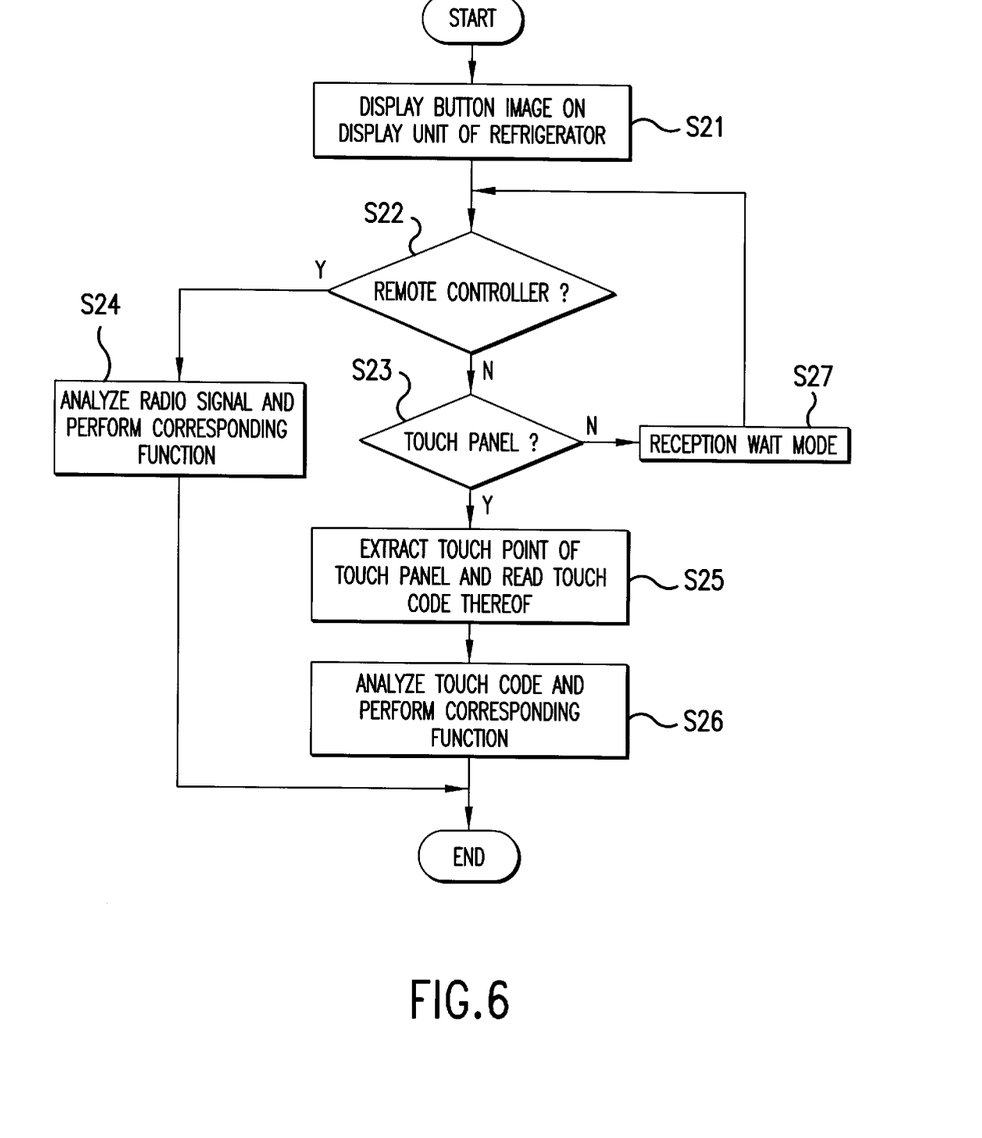
FIG. 6 is a flowchart illustrating a television watching control step of the method for controlling the communication-executable refrigerator in accordance with the present invention.

FIG. 6 is a flowchart illustrating a television watching control step of the method for controlling the communication-executable refrigerator in accordance with the present invention. With reference to FIGS. 2, 3 and 6, at the first step S21, for the television watching control, the main control unit 130 displays the button image 200 on the display unit 110 installed on the front surface of the refrigerator and arranges buttons in the displayed button image 200 at positions corresponding respectively to key signals from the touch panel 120.

At the second step S22, the main control unit 130 determines whether the radio signal input unit 160 has inputted a radio signal transmitted from the remote controller 150.

At the third step S23, if it is determined at the above second step S22 that the radio signal input unit 160 has inputted no radio signal from the remote controller 150, the main control unit 130 determines whether a specific button in the button image 200 displayed at the above first step S21 has been pushed.

At the fourth step S24, upon determining at the above second step S22 that the radio signal input unit 160 has inputted a radio signal transmitted from the remote controller 150, the main control unit 130 analyzes the transmitted radio signal and performs a corresponding function as a result of the analysis.

At the fifth step S25, upon determining at the above third step S23 that a specific button in the button image 200 has been pushed, the main control unit 130 extracts a touch point of the touch panel 120 with the user's hand or touch pen and reads a touch code of the extracted touch point.

At the sixth step S26, the main control unit 130 analyzes the touch code read at the above fifth step S25 and performs a corresponding function as a result of the analysis.

At the seventh step S27, if it is determined at the above third step S23 that no specific button in the button image 200 has been pushed, the main control unit 130 enters a reception wait mode to wait for the reception of a specific key signal and then returns to the above second step S22 to perform the television watching control function according to the operation of the remote controller 150 or touch panel 120.

In the present embodiment, an abbreviated button may be provided to minimize the size of the remote control window of the button image 200 so as to reduce the area occupied on the display unit 110 by the button image 200. The abbreviated button is positioned on a portion of the screen of the display unit 110 when it is pushed to minimize the size of the remote control window of the button image 200. Then, if the abbreviated button is again pushed, the remote control window of the button image 200 is enlarged to the original size on the screen of the display unit 110.

As apparent from the above description, the present invention provides a system and method for controlling a refrigerator capable of transmitting and receiving information over an external communication network. A display unit is installed on the front surface of the refrigerator to display an image on its screen, and a touch panel is connected to the display unit to input a variety of user commands through touch by the user. A schedule management function, a self-diagnosis management function and a component replacement time management function are performed and, if an emergency situation occurs while those functions are performed, a pop-up message is outputted to the screen and information related to the pop-up message is transmitted over the external communication network. Therefore, the user can recognize an emergency situation at a correct date, manage the refrigerator more efficiently and rapidly and handle information more conveniently.

Further, a touch panel responsive to the user's hand or a touch pen and a remote controller of a radio signal type are selectively used to input a variety of function key signals enabling a user to watch television through the display unit installed on the front surface of the refrigerator. Therefore, during housekeeping, the user can conveniently watch the television, enter desired key signals or check delivered mails or character messages based on key inputs entered by himself or herself. Moreover, a camera and microphone are provided to send and receive image and voice mails, thereby removing the inconvenience of key input.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling a communication-executable refrigerator, comprising:
    a refrigerator microcomputer for controlling all components in the refrigerator to perform refrigeration and freezing functions of said refrigerator;
    a display unit installed on a front surface of said refrigerator for displaying an image on its screen in response to an external video control signal;
    a touch panel connected to said display unit for calculating coordinate values of a contact point with a user, detecting a position of the calculated coordinate values from the screen and inputting a command corresponding to the detected position; and
    a main control unit for controlling an image output to said display unit and performing a function associated with the command inputted by said touch panel.

2. The system as set forth in claim 1, wherein a communication interface is installed in said refrigerator and connected to an external communication network to perform data communication.

3. The system as set forth in claim 2, wherein said main control unit includes a communication controller for connecting said main control unit to said refrigerator microcomputer through said communication interface.

4. The system as set forth in claim 1, further comprising a camera mounted to said refrigerator for picking up an image within a given area and generating the resulting video signal.

5. The system as set forth in claim 1, further comprising:
    a microphone mounted to said refrigerator for performing a voice input function under the control of said main control unit; and
    a speaker mounted to said refrigerator for performing a voice output function under the control of said main control unit.

6. The system as set forth in claim 1, further comprising a tuner for performing a channel selection or tuning operation for television reception under the control of said main control unit.

7. The system as set forth in claim 1, wherein said touch panel is adapted to input a variety of function key signals for television watching, said function key signals including a channel selection key signal and a volume adjustment key signal.

8. The system as set forth in claim 1, further comprising a remote controller for generating radio signals to remotely control a variety of functions for television watching, said functions including a channel selection function and a volume adjustment function.

9. The system as set forth in claim 8, further comprising a radio signal input unit for inputting said radio signals from said remote controller and transferring the inputted radio signals to said main control unit.

10. The system as set forth in claim 1, wherein said touch panel includes a predetermined number of screen areas, said screen areas being assigned different touch codes corresponding respectively to a variety of function key signals.

11. The system as set forth in claim 1, further comprising a data storage unit for storing or outputting information in response to a write or read command from said main control unit.

12. The system as set forth in claim 11, wherein said data storage unit is adapted to compression-store an image mail under the control of said main control unit for sending or reception of the image mail using said camera, speaker and microphone.

13. The system as set forth in claim 11, wherein said data storage unit includes an address directory memory for storing a directory of mail destination addresses created by the user.

14. The system as set forth in claim 1, wherein said main control unit is adapted to, upon detecting the reception of a mail through said external communication network, display information about the mail reception on said display unit until the user checks the received mail.

15. The system as set forth in claim 1, wherein said main control unit is adapted to output an information transmission button image to said display unit for the transmission of information related to a pop-up message.

16. The system as set forth in claim 15, wherein said information transmission button image includes:

an order button for purchasing specific goods over said external communication network;

a call button for generating an external call during self-diagnosis management; and a message send button for sending a specific message to a mobile terminal at a time set by the user.

17. The system as set forth in claim 1, wherein said main control unit operates interactively with said refrigerator microcomputer to perform a schedule management function, a self-diagnosis management function and a component replacement time management function and meanwhile output a pop-up message to said display unit upon the occurrence of an emergency situation.

18. A method for controlling a communication-executable refrigerator, comprising the steps of:

a), by a main control unit operating interactively with a refrigerator microcomputer which controls all components in the refrigerator, performing a schedule management function, a self-diagnosis management function and a component replacement time management function and meanwhile creating a pop-up message upon the occurrence of an emergency situation;

b) outputting the pop-up message created at said step a) to a display unit installed on a front surface of said refrigerator and in turn an information transmission button image to said display unit to transmit information related to said pop-up message over an external communication network; and c), if a specific button in said information transmission button outputted at said step b) is pushed by a user, forwarding information associated with the pushed button to a predetermined destination address over said external communication network.

19. A method for controlling a communication-executable refrigerator, comprising the steps of:

a), by a main control unit which controls all functions associated with television watching, outputting a button image including a variety of function key buttons to a display unit, said function key buttons including a reception mode selection button, a channel selection button and a volume adjustment button, said display unit being installed on a front surface of the refrigerator to display an external image;

b) determining whether a specific screen area of a touch panel has been touched by a user, said touch panel being connected to said display unit and having a plurality of screen areas for inputting a variety of function key signals corresponding respectively to said function key buttons of said button image outputted at said step a); and c) analyzing a touch code of the specific screen area of said touch panel if it is determined at said step b) that said specific screen area of said touch panel has been touched by the user and performing a function corresponding to said touch code as a result of the analysis.

20. The method as set forth in claim 19, further comprising the step of:

d) determining whether a remote controller has transmitted a radio key signal according to a user's operation, if it is determined at said step b) that no specific screen area of said touch panel has been touched by the user, and then setting a key signal reception mode in accordance with the determined result.

21. A method for controlling a communication-executable refrigerator, comprising the steps of:

a) installing a communication interface, a display unit, a touch panel and a main control unit in the refrigerator for the implementation of data communication over an external communication network and in turn a camera, a speaker and a microphone in said refrigerator for sending or reception of an image mail;

b), by said main control unit, determining whether a user requests the creation or checking of the image mail; and c), by said main control unit, controlling said camera, speaker and microphone in accordance with the result determined at said step b) to send or receive said image mail.

* * * * *